United States Patent [19] [11] Patent Number: 5,137,970
Eckel et al. [45] Date of Patent: * Aug. 11, 1992

[54] POLYCARBONATE/ABS COMPOSITIONS OF HIGH HEAT RESISTANCE

[75] Inventors: Thomas Eckel, Dormagen; Dieter Wittmann, Cologne; Dieter Freitag, Krefeld; Uwe Westeppe, Mettmann; Karl-Heinz Ott, Leverkusen, all of Fed. Rep. of Germany

[73] Assignee: Bayer Aktiengesellschaft, Levenkusen, Fed. Rep. of Germany

[*] Notice: The portion of the term of this patent subsequent to Apr. 14, 2009 has been disclaimed.

[21] Appl. No.: 532,404

[22] Filed: Jun. 4, 1990

[30] Foreign Application Priority Data

Jun. 9, 1989 [DE] Fed. Rep. of Germany ....... 3918895

[51] Int. Cl.$^5$ .............................................. C08L 69/00
[52] U.S. Cl. ...................................... 525/67; 525/133
[58] Field of Search ........................... 528/196; 525/67

[56] References Cited

U.S. PATENT DOCUMENTS

| 3,398,212 | 8/1968 | Jackson, Jr. et al. | 260/860 |
| 3,988,389 | 10/1976 | Margotte | 525/67 |
| 4,469,833 | 9/1984 | Mark | 524/161 |
| 4,554,309 | 11/1985 | Mark et al. | 524/611 |
| 4,563,469 | 1/1986 | Butler et al. | 514/339 |
| 4,839,426 | 6/1989 | Gallucci | 525/146 |
| 4,982,014 | 1/1991 | Freitag | 528/196 |

FOREIGN PATENT DOCUMENTS 362646 4/1990 European Pat. Off. .
60-252650 8/1991 Japan .

*Primary Examiner*—James J. Seidleck
*Assistant Examiner*—David Buttner
*Attorney, Agent, or Firm*—Joseph C. Gil; Aron Preis

[57] ABSTRACT

A molding composition comprising a mixture of an aromatic polycarbonate based on a substituted dihydroxy diphenylcyclohexane, a copolymer of a resin forming vinyl monomer and a graft polymer of a resin forming monomer onto a diene rubber, and a process for its manufacture and use for making heat resistant shaped articles are disclosed.

6 Claims, No Drawings

POLYCARBONATE/ABS COMPOSITIONS OF HIGH HEAT RESISTANCE

The invention relates to polymer blends suitable as thermoplastic moulding compositions of aromatic polycarbonates based on substituted dihydroxydiphenylcycloalkanes, copolymers of resin forming monomers and graft polymers of resin-forming monomers onto particulate diene rubbers, a process for the preparation of the polymer blends and their use for the production of heat-resistant shaped articles.

Polycarbonate/ABS mixtures and their use as moulding compositions are known. In general they contain a bisphenol A polycarbonate, a styrene/acrylonitrile copolymer and a graft copolymer e.g. of styrene and acrylonitrile onto a diene rubber as an impact modifier. These moulding compositions are distinguished by excellent notched impact strength (including at low temperatures) and easy processability (good flow properties). Their heat distortion temperature is, however, insufficient for some uses, e.g. where temperatures in excess of 120° C. occur (such as in the manufacture of automobile parts which are to be lacquered at >120° C.).

It has now been found that the heat distortion temperature of mixtures of aromatic polycarbonates, styrene/acrylonitrile copolymers and grafted diene rubbers is substantially improved when specific polycarbonates based on substitutd dihydroxydiphenylcycloalkanes are employed. The notched impact strength of these moulding compositions remains high.

The present invention relates to polymer blends suitable as thermoplastic moulding compositions comprising A. 3 to 99, preferably 40 to 98 and in particular 60 to 97 parts by weight of an aromatic polycarbonate wherein at least 20 mol % of the bifunctional carbonate structural units correspond to formula (I)

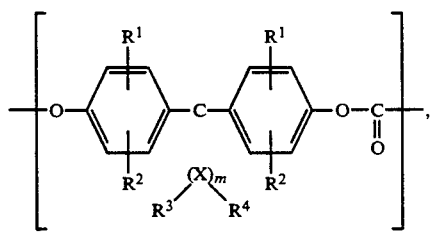

wherein
$R^1$ and $R^2$ independently of one another denote hydrogen, halogen, preferably chlorine or bromine, $C_1$–$C_8$-alkyl, preferably methyl or ethyl, $C_5$–$C_6$-cycloalkyl, preferably cyclohexyl, $C_6$–$C_{10}$-aryl, preferably phenyl, or $C_7$–$C_{12}$-aralkyl, preferably phenyl-$C_1$–$C_4$-alkyl and in particular benzyl,
m is an integer from 4 to 7, preferably 4 or 5,
$R^3$ and $R^4$ are selected individually for each X and independently of one another denote hydrogen or $C_1$–$C_6$-alkyl and
X denotes carbon, with the proviso that $R^3$ and $R^4$ on at least one atom X simultaneously denote alkyl, B. 3 to 95, preferably 5 to 50 parts by weight of a copolymer of B.1 50 to 98, preferably 60 to 95% by weight styrene, α-methylstyrene, ring-substituted styrenes, $C_1$–$C_8$-alkyl methacrylates, $C_1$–$C_8$-alkyl acrylates or mixtures thereof and B.2 50 to 2, preferably 40 to 5% by weight, acrylonitrile, methacrylates, $C_1$–$C_8$-alkyl acrylates, maleic anhydride, N-substituted maleimides and mixtures thereof, C. 1 to 95, preferably 2 to 60 and in particular 3 to 40 parts by weight of a diene rubber based graft polymer of C.1. 5 to 90, preferably 20 to 80 parts by weight of a mixture of C.1.1 50 to 98, preferably 60 to 95% by weight styrene, α-methylstyrene, stryrenes substituted in the ring by $C_1$–$C_4$-alkyl or halogen, $C_1$–$C_8$-alkyl methacrylates, $C_1$–$C_8$-alkyl acrylates or mixtures thereof and C.1.2 5 to 50, preferably 5 to 40by weight, acrylonitrile, methacrylonitrile, $C_1$–$C_8$-alkyl methacrylates, $C_1$–$C_8$-alkyl acrylates, maleic anhydride, $C_1$–$C_4$-alkyl- or phenyl-N-substituted maleimides or mixtures thereof on C.2 10 to 95, preferably 20 to 80 parts by weight diene rubber having an average particle diameter ($d_{50}$) of 0.09 to 1, preferably 0.09 to 0.6 μm and a gel content of more than 50, preferably more than 70 and in particular 73 to 98 weight %, and D. 0 to 80 parts by weight, preferably 5 to 75 parts by weight, of an aromatic polycarbonate different from polycarbonate A.

Polycarbonate A

Polycarbonates A in the sense of the invention are high molecular weight thermoplastic aromatic polycarbonates having molecuar weights $\overline{M}w$ (weight-average) of at least 10,000, preferably of 20,000 to 300,000, wherein at least 20 mol % of the bifunctional carbonate structural units correspond to formula (I)

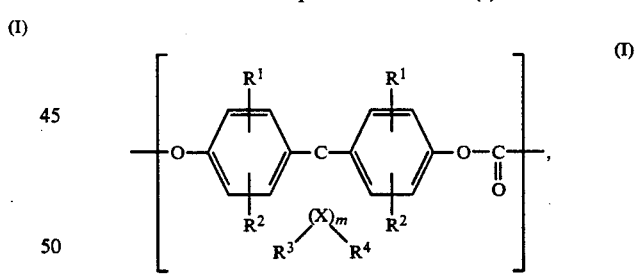

wherein
$R^1$, $R^2$, $R^3$, $R^4$, m and X have the abovementioned meaning,

Starting substances for the polycarbonates A are dihydroxydiphenylcycloalkanes of the formula (II)

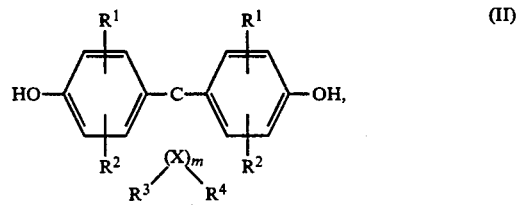

wherein

X, $R^1$, $R^2$, $R^3$, $R^4$ and m have the meaning given for formula (I).

Preferably, $R^3$ and $R^4$ are simultaneously alkyl on 1-2 atoms X, in particular on only one atom X. The particularly preferred alkyl radical is methyl; the X atoms in the α-position relative to the diphenyl-substituted C atom (C-1) are preferably not dialkyl-substituted, whereas alkyl disubstitution in the β-position relative to C-1 is preferred.

Dihydroxydiphenylcycloalkanes having 5 and 6 ring C atoms in the cycloaliphatic radical (m=4 or 5 in formula (II)), for example the diphenols of the formulae (IIa) to (IIc)

are preferred, 1,1-bis-(4-hydroxyphenyl)-3,3,5-trimethylcyclohexane (formula (IIa) where $R^1$ and $R^2$ are H) being particularly preferred.

The polycarbonates A can be prepared in accordance with German Offenlegungsschrift 3 832 396 from diphenols of the formula (II).

It is possible to use either one diphenol of the formula (II) to form homopolycarbonates or several diphenols of the formula (II) to form copolycarbonates.

The diphenols of the formula (II) can moreover also be used as a mixture with other diphenols, for example with those of the formula

HO—Z—OH          (III)

for the preparation of high molecular weight thermoplastic aromatic polycarbonates.

Other suitable diphenols of the formula (III) are those in which Z is an aromatic radical having 6 to 30 C atoms, which can contain one or more optionally substituted aromatic rings. In the case of polynuclear aromatic diphenols of the formula (III), the aromatic ring can be linked (bridged) by $C_1$-$C_6$-alkylidene or $C_5$-$C_6$-cycloalkylidene radicals, the cycloalkylidene radicals differing from those of the formulae (I) and (II), or by hetero atoms, such as O, S or N.

Examples of diphenols of the formula (III) are hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphones,
bis-(hydroxyphenyl)-sulphoxides,
α,α'-bis-(hydroxyphenyl)-diisopropylbenzenes
and ring-alkylated and ring-halogenated compounds thereof.

These and further suitable other diphenols are described e.g. in U.S. Pat. No. 3,028,365, 2,999,835, 3,148,172, 3,275,601, 2,991,273, 3,271,367, 3,062,781, 2,970,131 and 2,999,846, in German Offenlegungsschriften 1 570 703, 2 063 050, 2 063 052, 2 211 956, in French Patent Specification 1 561 518 and in the monograph "H. Schnell, Chemistry and Physics of Polycarbonates, Interscience Publishers, New York 1964".

Examples of preferred other diphenols are:
4,4'-dihydroxydiphenyl,
2,2-bis-(4-hydroxyphenyl)-propane,
2,4-bis-(4-hydroxyphenyl)-2-methylbutane,
1,1-bis-(4-hydroxyphenyl)-cyclohexane,
α,α'-bis-(4-hydroxyphenyl)-p-diisopropylbenzene,
2,2-bis-(3-methyl-4-hydroxyphenyl)-propane,
2,2-bis-(3-chlor-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl) sulphone,
2,4-bis-(3,5-dimethyl-4-hydroxyphenyl)-2-methylbutane,
1,1-bis-(3,5-dimethyl-4-hydroxyphenyl)-cyclohexane,
α,α'-bis-(3,5-dimethyl-4-hydroxyphenyl)-p-diisopropyl-benzene,
2,2-bis-(3,5-dichloro-4-hydroxyphenyl)-propane and
2,2-bis-(3,5-dibromo-4-hydroxyphenyl)-propane.

Examples of particularly preferred diphenols of the formula (III) are:
2,2-bis-(4-hydroxyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane and
1,1-bis-(4-hydroxyphenyl)-cyclohexane.

2,2-Bis-(4-hydroxyphenyl)-propane (bisphenol A) is particularly preferred.

The other diphenols of the formula (III) can be employed either individually or as a mixture.

The molar ratio of diphenols of the formula (II) to the optional other diphenols of the formula (III) optionally also to be used should be between 100 mol % (II) to 0 mol % (III) in the preferred polycarbonates is 100:0 to 20:80, preferably 80:20 to 25:75 and most preferably 60:40 to 30:70.

The polycarbonates (A) can be prepared by all known polycarbonate preparation processes. The various diphenols can be arranged randomly or in blocks.

The polycarbonates according to the invention can be branched in a manner which is known per se. If branching is desired, it can be achieved in a known manner by cocondensation of small amounts, preferably amounts from 0.05 to 2.0 mol % (based on the diphenols employed) of compounds which are trifunctional or more than trifunctional, in particular those with three or more than three phenolic hydroxyl group. Some branching agents with three or more than three phenolic hydroxyl groups are:
phloroglucinol, 4,6-dimethyl-2,4,6-tri-(4-hydroxyphenyl)-heptene-2,
4,6-dimethyl-2,4,6-tri-(4-hydroxyphenyl)-heptane,
1,3,5-tri-(4-hydroxyphenyl)-benzene,
1,1,1-tri-(4hydroxyphenyl)-ethane,
tri-(4-hydroxyphenyl)-phenylmethane,
2,2-bis-(4,4-bis-(4-hydroxyphenyl)-cyclohexyl)-propane,
2,4-bis-(4-hydroxyphenyl-isopropyl)-phenyl,
2,6-bis-(2-hydroxy-5-methyl-benzyl)-4-methylphenol,
2-(4-hydroxyphenyl)-2-(2,4-dihydroxyphenyl)-propane,
hexa-(4-(4-hydroxyphenyl-isopropyl)-phenyl)-ortho-terephthalate,
tetra-(4hydroxyphenyl)-methane,
tetra-(4-(4-hydroxyphenyl-isopropyl)-methane and
1,4-bis-((4',4''-dihydroxytripheyl)-methyl)-benzene, Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroxyindole.

Monofunctional compounds in the customary concentration are used as chain terminators for regulation, which is known per se, of the molecular weight of the polycarbonates A. Suitable compounds are e.g. phenol, tert. -butylphenols or other alkyl-$C_1$-$C_7$-substituted phenols. Small amounts of phenols of the formula (IV)

(IV)

wherein
R represents a branched $C_8$- or $C_9$-alkyl radical, are particularly suitable for regulation of the molecular weight.

Preferably, in the alkyl radical R, the proportion of $CH_3$ protons is 47 to 89% and the amount of CH and $CH_2$ protons is 53 to 11%; similarly preferably, R is in the o- or p-position relative to the OH group, and particularly preferably the upper limit of the ortho-content is 20%. The chain terminators are in general employed in amounts of 0.5 to 10, preferably 1.5 to 8 mol %, based on the diphenols employed.

The polycarbonates A can preferably be prepared by the phase interface polycondensation process (c.f. H. Schnell, "Chemistry and Physics of Polycarbonates", Polymer Reviews, Vol, IX, page 33 et seq., Interscience Publ., 1964) in a manner which is known per se. In this process, the diphenols of the formula (II) are dissolved in an aqueous alkaline phase. To prepare copolycarbonates with other diphenols, mixtures of diphenols of the formula (II) and the other diphenols, for example those of the formula (III), are employed. Chain terminators, e.g. of the formula (IV) can be added to regulate the molecular weight. The reaction is then carried out in the presence of a water immiscible inert organic liquid, which preferably dissolves the polycarbonate, using phosgene in accordance with the method of phase interface condensation. The reaction temperature is from 0° C. to 40° C.

Branching agents, if used, can be introduced together with the diphenols in the aqueous phase or added as a solution in the organic solvent prior to the phosgenation.

In addition to the diphenols of the formula (II) and optionally other diphenols of formula (III), monoand-/or bischlorocarbonic acid esters thereof can be used which are added as solutions in organic solvents. The amount of chain terminators and of branching agents then is governed by the molar amount of diphenolate radicals corresponding to formula (II) and, if present, of formula (III); if chlorocarbonic acid esters are also used, the amount of phosgene can be reduced accordingly in a known manner.

Suitable organic solvents for the chain terminators and, if present, for the branching agents and the chlorocarbonic acid esters are, for example, methylene chloride, chlorobenzene, acetone, acetonitrile and mixtures of these solvents, in particular mixtures of methylene chloride and chlorobenzene. The chain terminators and branching agents may be dissolved in the same solvent.

The organic phase used for the phase interface polycondensation is, for example, methylene chloride, chlorobenzene or mixtures of methylene chloride and chlorobenzene.

The aqueous alkaline phase used is, for example, aqueous NaOH solution.

The preparation of polycarbonates A by the phase interface polycondensation process can be catalysed in the customary manner by catalysts such as tertiary amines, in particular tertiary aliphatic amines, such as tributylamine or triethylamine; the catalysts can be employed in amounts of 0.05 to 10 mol %, based on diphenols employed. The catalysts can be added before the start of the phosgenation or during or also after the phosgenation.

The polycarbonates A can also be prepared by the known process in a homogeneous phase, the so-called "pyridine process" and by the known melt transesterification process using, for example, diphenyl carbonate instead of phosgene.

The polycarbonates A have, in particular, molecular weight $\overline{M}w$ (weight average, determined by gel chromatography after prior calibration) of 20,000 to 80,000. They can be linear or branched, and are homopolycarbonates or copolycarbonates based on the diphenols of the formula (II).

Copolymers B

Copolymers B which can be employed according to the invention are those of at least one monomer B1: styrene, α-methylstyrene and/or ring-substituted styrenes, $C_1$-$C_8$-alkyl methacrylate, and $C_1$-$C_8$-alkyl acrylate, and at least one monomer B2: acrylonitrile, methacrylonitrile, $C_1$-$C_8$-alkyl methacrylate, $C_1$-$C_8$-alkyl acrylate, maleic anhydride and/or N-substituted maleimide.

Methyl, ethyl and propyl acrylate as well as methyl methacrylates are particularly preferred.

Thermoplastic copolymers having a composition according to B can be formed as by-products in the preparation of graft polymer C, especially when large amounts of monomers are grafted onto small amounts of rubber. The amount of copolymer B to be employed does not include these by-products of the graft polymerization.

The copolymers B are resinous, thermoplastic and rubber-free.

The thermoplastic copolymers B contain in polymerised form 50 to 98, preferably 60 to 95% by weight B1 and 50 to 2, preferably 40 to 5% by weight B2.

Particularly preferred copolymers B are those of styrene and acrylonitrile and optionally methyl methacrylate; of α-methylstyrene and acrylonitrile and optionally methyl methacrylate; of styrene, α-methylstyrene and acrylonitrile and optionally methyl methacrylate.

The styrene-acrylonitrile copolymers B are known and can be prepared by free radical polymerization, in particular by emulsion, suspension, solution or bulk polymerization. The copolymers B preferably have molecular weight $\overline{M}w$ (weight-average, determined by light scattering or sedimentation) of 15,000 to 200,000.

Particularly preferred copolymers B according to the invention are also randomly built up copolymers of styrene and maleic anhydride, which can be prepared from the corresponding monomers by continuous bulk or solution polymerization with incomplete conversions.

The amounts of the two monomer units in the randomly built-up styrene-maleic anhydride copolymers which are suitable according to the invention can be varied within wide limits. The preferred content of maleic anhydride units is 5 to 25 weight %.

The molecular weight $\overline{M}n$ (number-average) of the randomly built styrene-maleic anhydride copolymers included in B can vary over a wide range. The range of 60,000 to 200,000 is preferred. A limiting viscosity of 0.3 to 0.9 (measured in dimethylformamide at 25° C.; c.f. Hoffmann, Krömer, Kuhn, Polymeranalytik (Polymer Analysis) I, Stuttgart 1977, page 316 et seq.) is preferred for these products.

Instead of styrene, the copolymers B can also contain in polymerised form ring-substituted styrenes, such as p-methylstyrene, vinyltoluene and 2,4-di-methylstyrene, and other substituted styrenes, such as α-methylstyrene.

Graft Polymers

Diene rubbers C.2 which are particularly suitable for preparation of the graft polymers C are polybutadiene, butadiene copolymers containing up to 30 weight %, based on the weight of rubber, of other ethylenically unsaturated monomers, such as styrene or acrylonitrile, or esters of acrylic or methacrylic acid with $C_1$–$C_4$-alcohols, such as methyl methacrylate, ethyl acrylate, methyl acrylate or ethyl methacrylate, polyisoprene or polychloroprene. The preferred grafting base consists of pure polybutadiene.

These rubbers are in the form of at least partly crosslinked particles having an average particle diameter of 0.09 to 1 μm, in particular 0.1 to 0.6 μm.

The graft polymers C can be obtained by free radical grafting polymerization.

To prepare the graft polymer C, the grafting monomers C.1.1 and C1.2 are subjected to free radical grafting polymerization in the presence of the rubber C.2, in particular at 40° to 90° C. The graft polymerization can be carried out in suspension, dispersion or emulsion. Continuous or discontinuous emulsion graft polymerization is preferred. This graft polymerization is carried out using free radical initiators (such as peroxides, azo compounds, hydroperoxides, persulphates and perphosphates), and optionally using anionic emulsifiers, e.g. carboxonium salts, sulphonic acid salts or organic sulphates. In this reaction, graft polymers are formed with high grafting yields, i.e. a large amount of the polymer of monomers C.1 is bonded chemically to the rubber C.2.

The graft polymers C are generally obtained by graft polymerization of 5 to 90, preferably 20 to 80 parts by weight of a monomer or a monomer mixture C.1 onto 10 to 95, preferably 20 to 80 parts by weight of one of the abovementioned rubbers C.2.

Preferred monomer mixtures consist of 50 to 95 parts by weight styrene, α-methylstyrene (or other alkyl- or halogen-substituted styrenes) or $C_1$–$C_8$-alkyl methacrylates or $C_1$–$C_8$-alkyl acrylates, and of 5 to 50 parts by weight acrylonitrile, methacrylonitrile, $C_1$–$C_8$-alkylmethacrylates, $C_1$–$C_8$-alkyl acrylates, maleic anhydride or substituted maleimides.

Particularly preferred are acrylic acid methyl-, ethyl-, propyl- and butylester as well as methylmethacrylate.

Preferred monomers for building the graft shell are styrene/acrylonitrile or styrene/maleic anhydride. Small amounts of acrylic acid esters of primary or secondary aliphatic $C_1$–$C_8$-alcohols, preferably n-butyl acrylate, or acrylic or methacrylic acid esters of tert.-butanol, preferably t-butyl acrylate, can additionally be present as further monomers.

Preferred graft copolymers C are e.g. polybutadiene or butadiene/styrene copolymers grafted with styrene and/or acrylonitrile and/or (meth)acrylic acid alkyl esters. Such copolymers are described, for example, in DE-OS 1 694 173 (=U.S. Pat. No. 3,564,077). Particularly preferred polymers C are e.g. ABS polymers as described e.g. in DE-OS 2 035 390 (=U.S. Pat. No. 3,644,574) and in DE-OS 2 248 242 (=GB-PS 1 409 275).

The graft polymers C can be recovered from their latices by known processes, e.g. by coagulation with electrolytes (salts, acids or mixtures thereof) and subsequent purification and drying.

In the preparation of the graft polymers C, free polymers or copolymers of the grafting monomers which form the grafted shell are also in general formed in a certain degree, in addition to the actual graft copolymer. The grafting is always incomplete.

Graft polymers C in the sense of the invention are termed the products obtained by polymerization of the grafting monomers C.1 in the presence of the rubber C.2, i.e. in general mixtures of graft polymer and free (co-) polymer of the grafting monomers C.1.

The moulding compositions according to the invention have optimum properties when the amount of free (co-)polymer does not exceed 50, preferably 30 and in particular 20 weight %, of graft polymer C.

Polycarbonates

Homopolycarbonates and copolycarbonates can be employed as aromatic polycarbonates D provided they are different from component A. These are described e.g. in U.S. Pat. No. 2,999,835, GB-PS 772 627 and DE-OS 3 334 872. Particularly preferred polycarbonates are those based on bisphenol A.

The moulding compositions according to the invention can contain the customary amounts of other additives which are known for aromatic polycarbonates, copolymers and graft polymers, such as stabilizers, pigments, mould release agents, flameproofing agents and antistatics.

The moulding compositions according to the invention can be prepared by mixing the constituents in a known manner and subjecting the mixture to melt compounding or melt extrusion at elevated temperatures, preferably at 200° to 350° C., in the customary devices, such as internal kneaders, extruders or twin-screw extruders. The components can be mixed in succession or simultaneously.

The invention thus furthermore relates to a process for the preparation of the moulding compositions described by mixing the components at elevated temperature.

The moulding compositions according to the invention can be used for the production of all types of shaped articles, e.g. by injection moulding. Examples of shaped articles are: housing components (e.g. for domestic appliances, such as juice presses, coffee machines or mixers), covering plates for the building industry or car components. They are also employed for electrical equipment, e.g. for plug receptacles, because they have very good electrical properties.

Shaped articles can also be produced from sheets or films previously produced by thermoforming.

The invention furthermore thus relates to the use of the moulding composition described for the production of shaped articles.

EXAMPLES

The parts stated denote parts by weight.

Polycarbonate A

A.1 Polycarbonate based on bisphenol A/1,1-bis-(4-hydroxyphenyl)-3,3,5-trimethylcyclohexane (molar ratio 45:55).

Preparation:

1,436.4 g (6.3 mol) bisphenol A (2,2-bis-(4-hydroxyphenyl)-propane, 2,387.0 g (7.7 mol) 1,1-bis-(4-hydroxyphenyl)-3,3,5-trimethylcyclohexane, 7,476.0 g (84 mol) 45% NaOH are dissolved in 33.7 l waster under an inert gas, while stirring. A solution of 36.9 g (0.392 mol) phenol in 11 l methylene chloride and 13 l chlorobenzene is then added. 2,722 g (28 mol) phosgene are introduced into the well-stirred solution at pH 13 to 14 and 21° to 25° C. Thereafter, 14 ml ethylpiperidine are added and the mixture is stirred for a further 45 minutes. The bisphenolate-free aqueous phase is removed and the organic phase is acidified with phosphoric acid, washed with water until free from electrolytes and freed from the solvent. The polycarbonate had a rel. solution viscosity of 1.30. The glass transition temperature of the polymer was determined as 206° C. (DSC).

A.2 Polycarbonate based on bisphenol A/1,1-bis-(4-hydroxyphenyl)-3,3,5-trimethylcyclohexane (molar ratio 65:35). Preparation under A.1.

Copolymer B

Styrene/acrylonitrile copolymer having a styrene/acrylonitrile ratio of 72:28 and a limiting viscosity of 55 dl/g (measurement in dimethylformamide at 20° C.).

Graft Polymer C

Graft polymer of 50 parts by weight of a mixture of styrene and acrylonitrile in a ratio of 72:28 on 50 parts by weight particulate polybutadiene rubber (average particle diameter $d_{50}=0.4$ μm), prepared by emulsion polymerization.

Polycarbonates

Linear polycarbonate based on bisphenol A having a relative solution viscosity of 1.26 to 1.28, measured in $CH_2Cl_2$ at 25° C. and a concentration of 0.5 g/ml.

Preparation and Testing of the Moulding Compositions

A, B and C and optionally D were melted and homogenized on a twin-screw extruder (ZSK 32 from Werner & Pfleiderer) at temperature from 250° to 320° C.

Bars of dimensions 80×10×4 mm (processing temperature 260° C.) were produced from the moulding compositions on an injection moulding machine, and the notched impact strength was measured on these bars (according to the ISO 180 method) at room temperature and −20° C.

The Vicat B heat distortion temperature was determined in accordance with DIN 53 460.

TABLE 1

Composition of the moulding compositions and their properties

| Example | Components (Gew.-%) | | | | Vicat B 120 (°C.) | Notched impact strength $a_k$ at 20° C. (kJ/m²) |
|---|---|---|---|---|---|---|
| | A.2 | B | C | D | | |
| 1 (comp.) | — | 16 | 24 | 60 | 122 | 49 |
| 2 | 60 | 16 | 24 | — | 135 | 78 |

TABLE 2

Composition of the moulding compositions and their properties

| Example | Components (wt. %) | | | | Vicat B 120 (°C.) | Notched impact strength ($a_k$) (kJ/m²) | |
|---|---|---|---|---|---|---|---|
| | A.1 | B | C | D | | at 20° C. | at −20° C. |
| 3 (comp.) | — | 16 | 24 | 60 | 122 | 49 | 43 |
| 4 | 3 | 16 | 24 | 57 | 126 | 50 | 42 |
| 5 | 5 | 16 | 24 | 55 | 127 | 46 | 39 |
| 6 | 10 | 16 | 24 | 50 | 128 | 47 | 36 |
| 7 | 20 | 16 | 24 | 40 | 131 | 51 | 44 |
| 8 (comp.) | — | 11 | 16 | 73 | 133 | 57 | 47 |
| 9 | 3 | 11 | 16 | 70 | 135 | 58 | 46 |
| 10 | 5 | 11 | 16 | 68 | 137 | 52 | 45 |
| 11 | 10 | 11 | 16 | 63 | 138 | 54 | 46 |
| 12 | 20 | 11 | 16 | 53 | 143 | 51 | 38 |

We claim:

1. A thermoplastic molding composition comprising a blend of:
   A. 3 to 99 parts by weight of an aromatic polycarbonate wherein at least 20 mol % by weight of the bifunctional carbonate structural unit correspond to the formula (I)

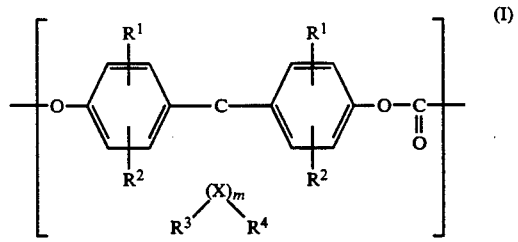

wherein
R¹ and R² independently of one another denote hydrogen, halogen, $C_1$-$C_8$-alkyl, $C_5$-$C_6$-cycloalkyl, $C_6$-$C_{10}$-aryl or $C_7$-$C_{12}$-aralkyl,
m is an integer from 4 to 7,
R³ and R⁴ are selected individually for each X and independently of one another denote hydrogen or $C_1$-$C_6$-alkyl and
X denotes carbon with the proviso that R³ and R⁴ on at least one atom X simultaneously denote alkyl, B. 3 to 95 parts by weight of copolymer of (i) (ii) or (iii) where
  (i) is a mixture of 50 to 98% by weight of at least one member selected from the group consisting of a α-methylstyrene, nuclear substituted styrene, and 50 to 2% by weight of at least one member selected from the group consisting of acrylonitrile, methacrylonitrile, $C_1$–$C_8$-alkyl methacrylate, $C_1$–$C_8$-alkyl acrylate, maleic anhydride and N-substituted maleamides, and where
  (ii) is a mixture of 50 to 98% by weight of at least one member selected from the group consisting of α-methylstyrene, nuclear substituted styrene, $C_1$–$C_6$-alkyl methacrylate and $C_1$–$C_8$-alkyl acrylates and 50 to 2% by weight of at least one member selected from the group consisting of acrylonitrile, methacrylonitrile, maleic anhydride and N-substituted maleamides, and where
  (iii) is a mixture of at least two members selected from the group consisting of $C_1$–$C_8$-alkyl methacrylate and $C_1$–$C_8$-alkyl acrylates,
C. 1 to 95 parts by weight of a diene rubber based graft polymer of
C.1 5 to 90 parts by weight of (i) (ii) or (iii) on 95 to 10 parts by weight of C.2 where
  (i) is a mixture of 50 to 98% by weight of at least one member selected from the group consisting of styrene, α-methylstyrene, styrenes substituted on the nucleus by $C_1$–$C_4$ alkyl or halogen, and 5 to 50% by weight of at least one member selected from the group consisting of acrylonitrile, methacrylonitrile, $C_1$–$C_8$-alkyl methacrylates, $C_1$–$C_8$-alkyl acrylates, maleic anhydride, $C_1$–$C_4$-alkyl-N-substituted maleimides and phenyl-N-substituted maleimides, and where
  (ii) is a mixture of 50 to 98% by weight of at least one member selected from the group consisting of styrene, α-methylstyrene, styrenes substituted on the nucleus by $C_1$–$C_4$-alkyl or halogen, $C_1$–$C_8$-alkyl methacrylates and $C_1$–$C_8$-alkyl acrylates, and 5 to 50% by weight of at least one member selected from the group consisting of acrylonitrile, methacrylonitrile, maleic anhydride, $C_1$–$C_4$-alkyl-N-substituted maleimides and phenyl-N-substituted maleimides, and where
  (iii) is at least two members selected from the group consisting of $C_1$–$C_8$-alkyl methacrylates and $C_1$–$C_8$-alkyl acrylates,
and where C.2 is a diene rubber having an average particle diameter ($d_{50}$) of 0.09 to 1 μm and a gel content of more than 50 weight %, D. 0 to 80 parts by weight of aromatic polycarbonate different from said polycarbonate A.

2. Blends according to claim 1, containing 40 to 98 parts by weight A, 5 to 50 parts by weight B and 2 to 60 parts by weight C.

3. Blends according to claim 1, wherein the average particle diameters of the diene rubbers C.2 are 0.09 to 0.6 μm.

4. Blends according to claim 1, wherein the gel content of the diene rubbers C.2 is more than 70 weight %.

5. Blends according to claim 1, containing stabilizers, pigments, flow auxiliaries, mould release agents, flameproofing agents and/or antistatics.

6. Shaped articles made from the polymer blends of claim 1.

* * * * *